(12) United States Patent
Vetro et al.

(10) Patent No.: US 7,209,519 B2
(45) Date of Patent: Apr. 24, 2007

(54) ENCODING A VIDEO WITH A VARIABLE FRAME-RATE WHILE MINIMIZING TOTAL AVERAGE DISTORTION

(75) Inventors: Anthony Vetro, Staten Island, NY (US); Huifang Sun, Cranbury, NJ (US); Yao Wang, Matawan, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 872 days.

(21) Appl. No.: 09/835,691

(22) Filed: Apr. 16, 2001

(65) Prior Publication Data
US 2003/0007558 A1    Jan. 9, 2003

(51) Int. Cl.
*H04N 7/12* (2006.01)
(52) U.S. Cl. ............................. 375/240.03
(58) Field of Classification Search ................
375/240.01–240.07, 240.11–240.16, 240.23, 375/240.24
See application file for complete search history.

(56) References Cited

U.S. PATENT DOCUMENTS

| | | | | |
|---|---|---|---|---|
| 5,822,465 | A * | 10/1998 | Normile et al. .............. | 382/253 |
| 5,936,669 | A * | 8/1999 | Niesen .................. | 375/240.12 |
| 5,969,764 | A | 10/1999 | Sun et al. ................... | 348/404 |
| 6,023,296 | A * | 2/2000 | Lee et al. .............. | 375/240.05 |
| 6,141,380 | A * | 10/2000 | Krishnamurthy et al. ..................... | 375/240.02 |
| 6,167,162 | A | 12/2000 | Jacquin et al. ............. | 382/251 |
| 6,222,881 | B1 * | 4/2001 | Walker .................. | 375/240.03 |
| 6,351,491 | B1 * | 2/2002 | Lee et al. .............. | 375/240.03 |
| 6,377,309 | B1 * | 4/2002 | Ito et al. ..................... | 348/554 |
| 6,396,956 | B1 * | 5/2002 | Ribas-Corbera et al. .... | 382/239 |
| 6,430,222 | B1 * | 8/2002 | Okada .................... | 375/240.03 |
| 6,526,097 | B1 * | 2/2003 | Sethuraman et al. ..... | 375/240.2 |
| 6,618,439 | B1 * | 9/2003 | Kuo et al. ............. | 375/240.16 |

FOREIGN PATENT DOCUMENTS

| | | |
|---|---|---|
| WO | WO 00/18137 | 3/2000 |
| WO | WO 02/071639 | 9/2002 |

OTHER PUBLICATIONS

Vetro, et al., "An Overview of MPEG-4 Object-Based Encoding Algorithms," Proceedings International IEEE Conference on Information Technology, Coding and Computing, Apr. 2, 2001.

Turga, et al., "Classification based mode decisions for video over network," IEEE Transactions on Multimedia, Mar. 2001, vol. 3, No. 1, pp. 41-52.

(Continued)

*Primary Examiner*—Mehrdad Dastouri
*Assistant Examiner*—Dave Czekaj
(74) *Attorney, Agent, or Firm*—Dirk Brinkman; Clifton D. Mueller; Gene V. Vinokur

(57) ABSTRACT

A method encodes a video as video objects. For each candidate object, a quantizer parameter and a skip parameter that jointly minimizes an average total distortion in the video are determined while satisfying predetermined constraints. The average total distortion includes spatial distortion of coded objects and spatial and temporal distortion of uncoded objects. Then, the candidate objects is encoded as the coded objects with the quantizer parameter and the skip parameter, and the candidate objects is skipped as the uncoded objects with the skip parameter.

8 Claims, 5 Drawing Sheets

OTHER PUBLICATIONS

Vetro, et al., "MPEG-4 Rate Control for Multiple Video Objects," IEEE Transactions on Circuits and Systems for Video Technology, vol. 9, No. 1, Feb. 1999, pp. 186-199.

Wang, et al., "Multi-program video coding with joint rate control," Global Communications Conference, Nov. 18, 1996, pp. 1516-1520.

Martins, et al., "Joint control of spatial quantization and temporal sampling for very low bit rate video," Proceeding of IEEE International Conference on Acoustics, Speech, and Signal Processing, May 7, 1996, pp. 2072-2075.

* cited by examiner

ENCODING A VIDEO WITH A VARIABLE FRAME-RATE WHILE MINIMIZING TOTAL AVERAGE DISTORTION

RELATED PATENT APPLICATION

This Patent Application is related to U.S. patent application Ser. No. 09/835,650, "ESTIMATING TOTAL AVERAGE DISTORTION IN A VIDEO WITH VARIABLE FRAMESKIP," filed by Vetro et al. on Apr. 16, 2001, now U.S. Pat. No. 6,671,324 issued Dec. 30, 2003.

FIELD OF THE INVENTION

This invention relates generally to video coding, and more particularly to optimally encoding videos according to rate-distortion characteristics of the videos.

BACKGROUND OF THE INVENTION

A number of video coding standards support variable frame rates, e.g., H.263 and MPEG-4. With variable frame-rates, any number of frames, or objects in the case of MPEG-4, can be skipped during the coding of the output video. That is, the skipped frames remain uncoded. With these video coding standards, the encoder may choose to skip frames of a video to either satisfy buffer constraints, or to optimize the video coding process. However, most encoders only skip frames to satisfy buffer constraints. Buffer constraints are usually due to bit-rate (bandwidth) limitations. The coder is forced to skip frames when insufficient bandwidth causes the buffer to fill up. Consequently, it is not possible to add any additional frames to the buffer, and these frames remain uncoded (skipped) until there is room in the buffer to store a new coded frame. This type of frame skipping can degrade the quality of the video because the content of the video is not considered. Note that skipping frames effectively reduces the frame-rate.

It is a problem to provide an optimal strategy for coding a video. Specifically, the video could be coded at a higher frame-rate having a lower spatial quality, or a lower frame-rate having a higher spatial quality. This trade-off between spatial and temporal quality is not a simple binary decision, but rather a decision over a finite set of coding parameters (constraints). Obviously, the best set of coding parameters will yield the optimal rate-distortion (R-D) curve that maximizes the frame-rate while minimizes the distortion. The two parameters of interest are the number of frames per second (fps or frame-rate) and a quantizer (Q) parameter. A higher quantizer parameter increases the spatial distortion. Lowering the frame rate, by skipping frames, reduces both the spatial and temporal distortion. In the known prior art, the distortion is measured only for coded frames, and is expressed as the mean-squared error (MSE) between pixels in the original video and the compressed video. That is, the prior art methods have two problems, only spatial distortion in coded frames is considered, and uncoded frames contributing to both the spatial and temporal distortion are not considered at all.

Generally, prior art optimized coding methods do not consider the temporal aspect of rate-distortion, see H. Sun, W. Kwok, M. Chien, and C. H. John Ju, "MPEG coding performance improvement by jointly optimizing coding mode decision and rate control," *IEEE Trans. Circuits Syst. Video Technol.*, June 1997, T. Weigand, M. Lightstone, D. Mukherjee, T. G. Campbell, S. K. Mitra, "R-D optimized mode selection for very low bit-rate video coding and the emerging H.263 standard," *IEEE Trans. Circuits Syst. Video Technol.*, and April 1996, J. Lee and B. W. Dickenson, "Rate-distortion optimized frame type selection for MPEG encoding," *IEEE Trans. Circuits Syst. Video Technol.*, June 1997. Generally, it is assumed that the frame-rate is fixed.

These methods consider optimizations on the quantizer parameter, H. Sun, W. Kwok, M. Chien, and C. H. John Ju, "MPEG coding performance improvement by jointly optimizing coding mode decision and rate control," *IEEE Trans. Circuits Syst. Video Technol.*, June 1997, mode decisions for motion and block coding, T. Weigand, M. Lightstone, D. Mukherjee, T. G. Campbell, S. K. Mitra, "R-D optimized mode selection for very low bit-rate video coding and the emerging H.263 standard," *IEEE Trans. Circuits Syst. Video Technol.*, April 1996, and frame-type selection, J. Lee and B. W. Dickenson, "Rate-distortion optimized frame type selection for MPEG encoding," *IEEE Trans. Circuits Syst. Video Technol.*, June 1997. Such methods can achieve an optimum coding when the frame-rate is fixed, and the bit-rate can be met for the given frame-rate. However, these methods are less than optimal for varying frame-rates.

It should be noted that the trade-off between spatial and temporal quality, while coding, has been described by F. C. Martins, W. Ding, and E. Feig, in "Joint control of spatial quantization and temporal sampling for very low bit-rate video," *Proc. ICASSP*, May 1996. However, in their method, the trade-off was achieved manually.

Therefore, it is desired to provide a method and system for encoding a video subject to a variable frame-rate, while minimizing the total average distortion.

SUMMARY OF THE INVENTION

The present invention optimizes the encoding of a video that allows a variable frame-rate. The invention provides a method for determining an average distortion for coded frames as well as uncoded frames. Using this method in conjunction with methods that determine the frame-rate, enables the invention to make an optimal trade-off between the spatial and temporal quality in an encoded video that optimally minimize the average total distortion, which includes both spatial and temporal distortion.

More particularly, a method encodes a video objects. For each candidate object, a quantizer parameter and a skip parameter that jointly minimizes an average total distortion in the video are determined while satisfying predetermined constraints. The average total distortion includes spatial distortion of coded objects and spatial and temporal distortion of uncoded objects. Then, the candidate objects is encoded as the coded objects with the quantizer parameter and the skip parameter, and the candidate objects is skipped as the uncoded objects with the skip parameter.

DETAILED DESCRIPTION OF THE PREFERRED EMBODIMENT

Introduction

Figure 1:
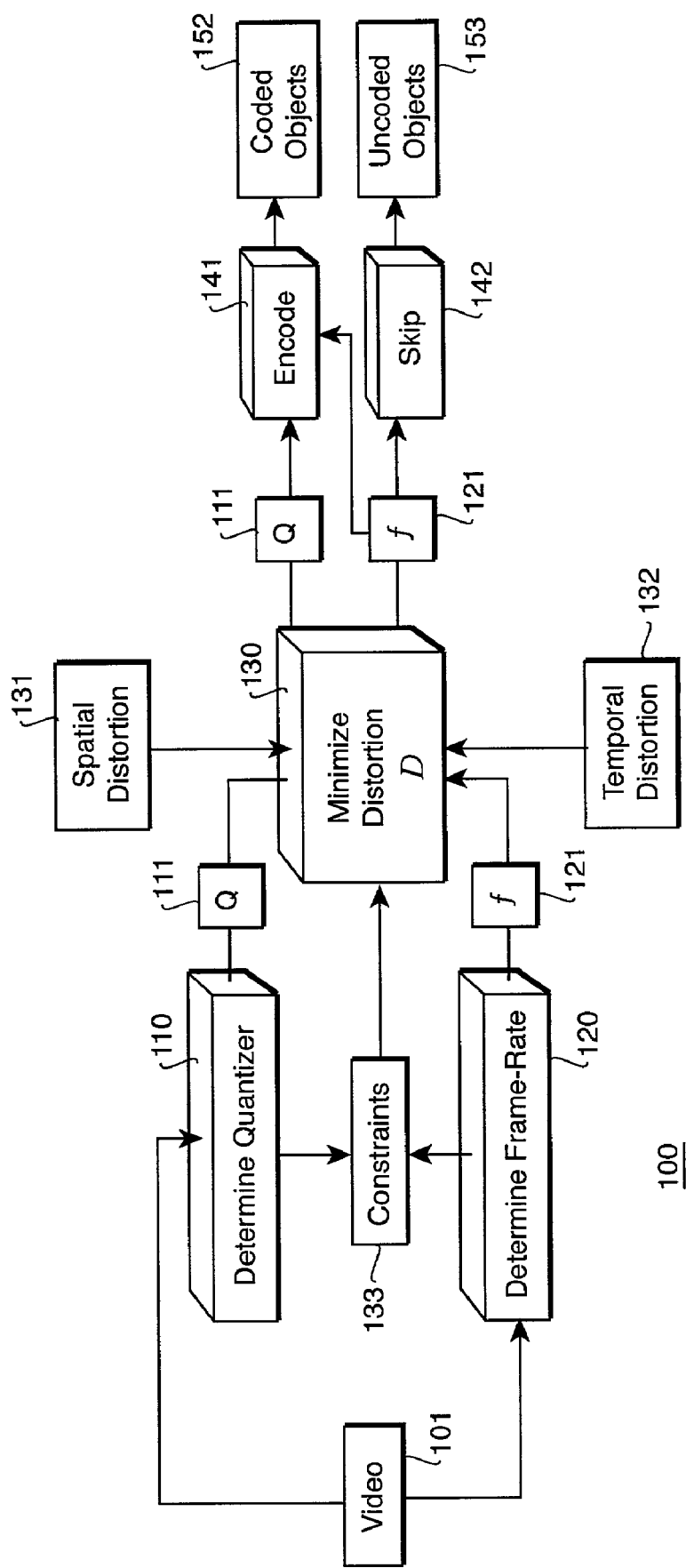
FIG. 1 is a flow diagram for encoding a video with variable video-object plane (VOP) rates.

As shown in FIG. 1, our invention provides a method 100 for coding a video 101. Moreover, the video 101 is coded with a variable temporal rate for Video Object Planes (VOP's), or simply with variable VOP-rates. Our method determines 110 a quantizer parameter (Q) 111 for each object, and also determines 120 a VOP-skip parameter, or simply skip parameter ($f_s$) 121. The quantizer and VOP-rate parameters jointly minimize 130 spatial distortion 131 and a temporal distortion 132 in the video, while satisfying predetermined constraints 133. Then, the object is encoded 141 as a coded object 152 with the quantizer parameter 111 and the VOP-rate parameter 121, or skipped 142 as an uncoded object 153 with only the skip parameter 121 parameter to minimize the average distortion while satisfying the constraints 133. According to the skip parameter 121, a coded object 152 at a given time instant is encoded 141 with quantization parameter 111. During this process, ($f_s$−1) uncoded objects 153 are skipped 142.

It should be noted, that in general, a frame is a specific example of a video object as defined in the MPEG-4 standard, particularly a fixed-size, rectangular video object. However, the invention generally applies to any video object having arbitrary variable shape and size. Hereinafter, we occasionally use the more familiar term frame to described an exemplary embodiment of any video object.

In addition, the invention can concurrently encode multiple video objects, perhaps frames of multiple program streams in a single transport stream, or multiple objects in a single program stream, or both.

Determining Distortion

Figure 2:
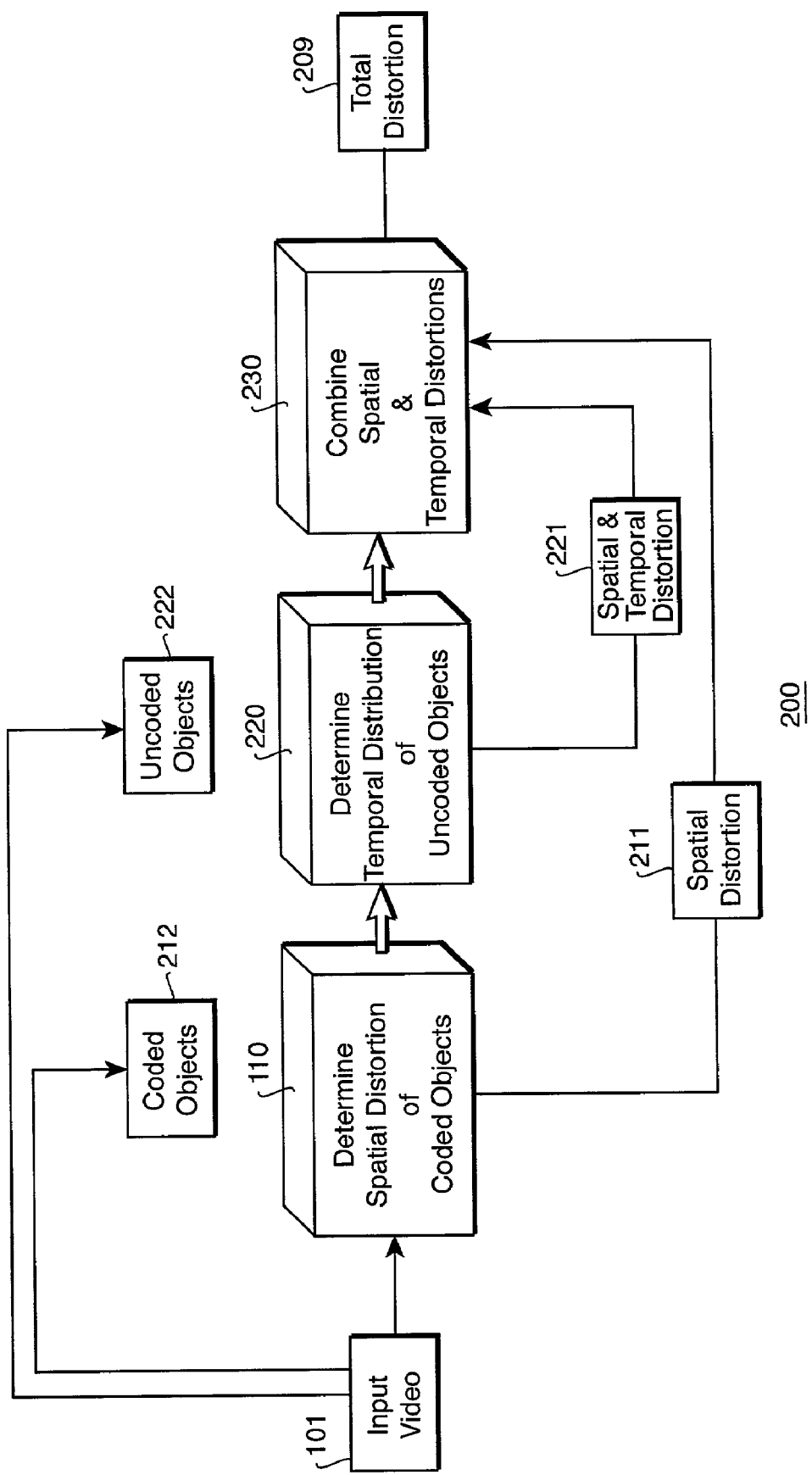
FIG. 2 is a flow diagram of a method for determining average total distortion in a video according to the invention.

FIG. 2 shows a method 200 for determining the average distortion due to spatial 131 and temporal 132 distortion in the video 101. The coded objects 212 and uncoded objects 222 are candidate objects to be coded or skipped according to the method of FIG. 1.

We denote the spatial distortion 211 for coded objects 212 by $\overline{D}_c(Q)$ and the spatial and temporal distortion 221 of uncoded objects 222 by $\overline{D}_s(Q, f_s)$ where Q represents the quantizer parameter 111, and $f_s$ the skip parameter 121, defined in greater detail below. In short, a skip parameter equal to 3 means: code every third object (frame) in a time sequence; a skip parameter equal to 4 means code every fourth instance, and a skip parameter equal to 1 means code every object (frame) instance without skipping any. In other words, the skip parameter is equal to the number of frames that have been skipped at a given time instant, plus one. This parameter may change throughout the encoding of video. However, the average skip parameter $\bar{f}_s$, discussed below, may be used to indicate a longer-term effect regarding implications on the average bit-rate.

The spatial distortion 211 is dependent on the quantizer parameter Q, a spatial measure, while the temporal distortion 221 depends on both the quantizer and skip parameters.

Although the average distortion for uncoded objects does not directly influence the distortion of coded objects, the first distortion does influence the second distortion indirectly in two ways. First, the number of uncoded objects influences a residual statistical component, and second, the first distortion influences the quantizer parameter that is selected.

It is important to note that the distortion 211 for the uncoded frames 222 has a direct dependency on the quantization step size in the coded frames 212. The reason is that the uncoded frames 222 are interpolated from the coded frames 212, thereby carrying the same spatial quality, in addition to the temporal distortion caused by skipping the frame.

Given the above, we determine the average distortion over a specific time interval $(t_i, t_{i+f_s}]$ by, $$\overline{D}_{(t_i, t_{i+f_s}]}(Q_{i+f_s}, f_s) = \frac{1}{f_s}\left[D_c(Q_{i+f_s}) + \sum_{k=i+1}^{i+f_s-1} D_s(Q_i, k)\right]. \quad (1)$$

In equation 1, the average distortion over the specified time interval is due to the spatial distortion of one coded object at $t = t_{i+f_s}$, plus the temporal distortion of $f_s$−1 uncoded objects. The temporal distortion is dependent on the quantizer parameter for the previously coded object at $t = t_i$.

Spatial Distortion

The variance of the quantization error is $$\sigma_q^2 = a \cdot 2^{-2R} \cdot \sigma_z^2, \quad (2)$$

where $\sigma_z^2$ is the input signal variance, R is the average rate per sample, and a is a constant that is dependent on the probability distribution function (PDF) of the input signal and quantizer characteristics, see Jayant et al. "*Digital Coding of Waveforms,*" Prentice Hall, 1984. In the absence of entropy coding, the value of a typically varies between 1.0 and 10. With entropy coding, the value of a can be less than 1.0. We use equation 2 to determine 210 the spatial distortion 211 as, $$D_c(Q_i) = a \cdot 2^{-2R(ri)} \cdot \sigma_{z_i}^2. \quad (3)$$

Equation 3 is valid for a wide array of quantizer parameters and signal characteristics. Such aspects are accounted for in the value of a. However, as stated above, the number uncoded objects can impact the statistics of the residual. In general, we have determined that the average bits per object increases for larger values of $f_s$.

However, the variance remains substantially the same. This indicates that the variance is incapable of reflecting small differences in the residual that impact the actual relation between rate and distortion. This is caused by the presence of high-frequency coefficients. Actually, it is not only the presence of the high-frequency coefficients, but also their position. If certain run-lengths are not present in a variable length coding table, e.g. Huffman coding, less efficient escape coding techniques must be used. This probably means that $f_s$ affects the PDF of the residual, i.e., the value of a, while holding $\sigma_{z_i}^2$ substantially fixed.

We ignore any changes in the residual due to the uncoded frames, and use the model given by equation 3 to determine the spatial distortion 211. A fixed a and $\sigma_{z_i}^2$ determined from the last coded frame is used.

Temporal Distortion

To determine 220 the spatial and temporal distortion 221 of the uncoded objects 222, we assume, without loss of generality, that a temporal interpolator of a coder can simply repeat the last coded object. Other interpolators, that average past and future coded objects, or make predictions based on motion, can also be considered.

As stated above, the distortion due to uncoded frames has two parts: one spatial due to the coding of the reference frame (last coded frame), and another temporal due to the interpolation error. We express the distortion at $t_k$ as, $$e_k = \psi_k - \hat{\psi}_k = \psi_k - \tilde{\psi}_i = \underbrace{\psi_k - \psi_i}_{\Delta z_{i,k}} + \underbrace{\psi_i - \tilde{\psi}_i}_{\Delta c_i}, \quad (4)$$

wherein $\hat{\psi}_k$ denotes the estimated frame at $t=t_k$, $\tilde{\psi}_i$ denote the last coded frame at $t_i<t_k$, $\hat{\psi}_k=\tilde{\psi}_i$, and $\Delta z_{i,k}$ and $\Delta c_i$ represent the frame interpolation error and coding error, respectively. If these quantities are independent, the mean square error (MSE) is $$E\{e_k^2\}=E\{\Delta^2 c_i\}+E\{\Delta^2 z_{i,k}\}, \quad (5)$$

which can be equivalently expressed as, $$D_s(Q_r,k)=D_c(Q_i)+E\{\Delta^2 z_{i,k}\}, \quad (6)$$

that is, the combination 230 of the spatial and temporal distortions. Equation 6 implies that the components contributing to the spatial and temporal distortion 221 are additive. However, other combinations may also be considered.

To derive the expected MSE due to frame interpolation, we first assume that the frame at time $t_k$ is related to the frame at time $t_i$ with motion vectors $(\Delta x(x,y),\Delta y(x,y))$, $$\psi_k(x,y)=\psi_i(x+\Delta x(x,y),y+\Delta y(x,y)). \quad (7)$$

In the equation 7, it is assumed that every pixel (x,y) has an associated motion vector. In actuality, we approximate the motion at every pixel by having one motion vector per macroblock. Then, $$\Delta z_{i,k} = \psi_i(x+\Delta x_{i,k}, y+\Delta y_{i,k}) - \psi_i(x,y) = \frac{\delta\psi_i}{\delta x}\Delta x_{i,k} + \frac{\delta\psi_i}{\delta y}\Delta y_{i,k}, \quad (8)$$

where $$\left(\frac{\delta\psi_i}{\delta x}, \frac{\delta\psi_i}{\delta y}\right)$$

represent the spatial gradients in the x and y directions. Note, this equation is expanded by using a first-order Taylor expansion and is valid for small $(\Delta x, \Delta y)$. This is equivalent to an optical flow equation, where the same condition on motion is also true.

It should be noted that equation 8 is less accurate when the amount of motion in a sequence of frames is large. However, for coding applications that estimate the distortion to decide if a lower MSE can be achieved with more uncoded frames, the accuracy of the motion estimation is not so critical because an optimized encoder would not skip frames for such sequences anyway. The MSE incurred by skipping frames in a sequence with large motion would be very large.

Treating the spatial gradients and motion vectors as random variables and assuming the motion vectors and spatial gradients are independent and zero-mean, we have, $$E\{\Delta^2 z_{i,k}\}=\sigma_{x_i}^2\sigma_{\Delta x_{i,k}}^2+\sigma_{y_i}^2\sigma_{\Delta y_{i,k}}^2, \quad (9)$$

where $(\sigma_{x_i}^2,\sigma_{y_i}^2)$ represent the variances for the x and y spatial gradients in frame i, and $(\sigma_{\Delta x_{i,k}}^2,\sigma_{\Delta y_{i,k}}^2)$ represent the variances for the motion vectors in the x and y direction. Equation 9 shows that it is sufficient to determine the temporal distortion from the second-order statistics of the motion and spatial gradient.

The model in equation 9 is accurate for low to moderate motion sequences, This is sufficient because an optimized coder would not need such an accurate model when the motion is high, see U.S. patent application Ser. No. 09/835,650, "ESTIMATING TOTAL AVERAGE DISTORTION IN A VIDEO WITH VARIABLE FRAMESKIP," filed by Vetro et al. on Apr. 16, 2001, now U.S. Pat. No. 6,671,324 issued Dec. 30, 2003, and incorporated herein in its entirety by reference.

Determining Rate

A quadratic rate-quantizer (R-Q) relationship for a single object at time $t=t_k$ can be determined by, $$R(t_k) = S_k\left(\frac{X_{1,k}}{Q_k} + \frac{X_{2,k}}{Q_k^2}\right), \quad (10)$$

where $S_k$ is the encoding complexity, often substituted by the sum or mean of absolute differences of the residual component, $Q_k$ denotes the quantizer parameter 111 and $X_{i,k}$ denotes the model parameters that are fitted to the data, see T. Chiang and Y-Q. Zhang, "A new rate control scheme using quadratic rate-distortion modeling," *IEEE Trans. Circuits Syst. Video Technol.*, February 1997, A. Vetro, H. Sun, and Y. Wang, "MPEG-4 rate control for multiple video objects," *IEEE Trans. Circuits and Syst. Video Technol.*, February 1999. Other methods can also be used, see H. M. Hang and J. J Chen, "Source model for transform video coder and its application—Part I: Fundamental theory," *IEEE Trans. Circuits Syst. Video Technol.*, vol. 7, no. 2, pp. 287–298, April 1997. In any case, given the R-Q relationship for a single frame, the average bit-rate over time, $\bar{R}$ is determined by, $$\bar{R} = \sum_{k=i}^{i+F} R(t_k) \cong \bar{F} \cdot \bar{R}(t_k), \quad (11)$$

where the $\bar{F}$ is the average frame-rate, and $\bar{R}(t_k)$ is the average bit-rate per frame.

The parameter that relates the rate and distortion is the skip parameter, $f_s$ introduced above. This parameter can change at each coding instant, therefore the relation between the skip parameter and the average coded frame rate, $\bar{F}$, is defined by the average skip parameter, $\bar{f}_s$, and is given by, $$\bar{f}_s = \frac{F_{STC}}{\bar{F}}, \quad (12)$$

where $F_{src}$ is the source frame-rate. For example, if the source-frame rate is 30 fps, and the average coded frame rate is 10, then the skip parameter is 3, and only every third frame, i.e., $$\left(\frac{1}{f_s}\right),$$

frames is coded. To be clear, $f_s$ is a parameter used to quantify the distortion due to skipping objects or frames. In turn, this parameter affects the values of $\bar{f}_s$ and $\bar{F}$, and ultimately relates to the average bit-rate $\bar{R}$.

Frame-Based Rate Control

We have described how to determine the frame-rate for the coded frames, or generally video objects, and the average distortion over a given time interval for the coded and uncoded objects. We now describe a rate control method that minimizes the average distortion, subject to constraints on the overall bit-rate and buffer occupancy. Formally, we express the method and its three constraints by, $$\operatorname{argmin}_{[Q_{i+f_s}, f_s]} \bar{D}_{[t_i, t_{i+f_s}]}(Q_{i+f_s}, f_s) \quad (13)$$

$$s.t. \begin{cases} \bar{R} \le R \\ B_i + R(t_{i+f_s}) < B_{\max} \\ B_i + R(t_{i+f_s}) - f_s \cdot R_{drain} > 0 \end{cases}$$

where R is the target bit-rate, $B_{max}$ is the maximum buffer size in bits, $B_i$ is the current buffer level, also in bits, and $R_{drain}$ is the rate at which the buffer "drains" per object.

Informally, we determine the values of the quantizer (Q) 111 and skip parameter (f) 121 that minimize 130 the average distortion 131–132, such that the target bit-rate, buffer size, buffer level, and drain rate constraints are satisfied.

Figure 3:
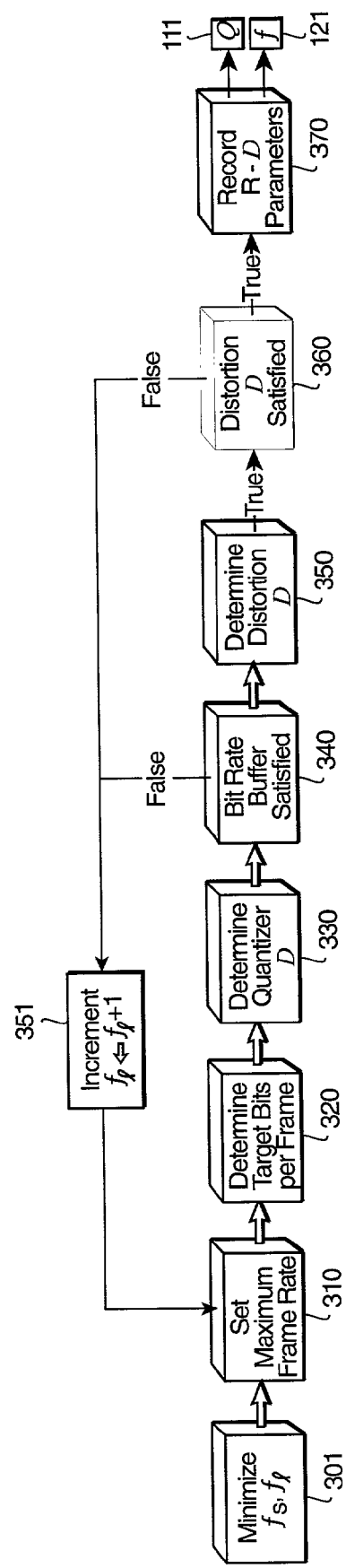
FIG. 3 is a flow diagram of a method for determining optimum rate-distortion values while encoding a video with a variable frame rate.

As shown in FIG. 3, we determine the minimizing rate-distortion parameters 131–132 by the following process steps. Let $f_l$ denote the skip parameter computed in a previous coding iteration. We begin encoding the video 101 sequence by setting $f_l$ equal to 1. This means that the full frame-rate is initially used, and all frames are encoded. Then, the iterations at each coding instant are as follows.

In step 310, we set the maximum skip parameter as $f_s=\max\{1, f_l-\delta\}$, $D_{min}=\infty$.

In step 320, we determine the target number of bits for the object. This value is mainly dependent on the current value of $f_s$ and $B_i$.

In step 330, we determine the value of the quantizer parameter $Q_{i+f_s}$ using equation 10.

In step 340, we determine if the quantizer parameter 111 and skip parameter 121 still satisfies bit-rate and buffer constraints. If false, then increment 351 the parameter long as the new $f_s \le \min\{f_l+\delta, f_{max}\}$ because the current value of $f_s$ is no longer valid, and iterate the previous steps.

In step 350, we determine the distortion using equation 1.

Otherwise, if true, in step 360, we determine if the current distortion is less than $D_{min}$. If false, we proceed with step 351 as described above. If true, replace $D_{min}$ with the current distortion and record 370 the encoding parameters $f_s$ 121 and $Q_{i+f_s}$ 111 for this given coding time instant. It should be noted that the parameter $\delta$ is used to limit the frame-rate from one coded frame to another, similar to the known bounding of the quantizer parameter 111. is used to limit the frame-rate from one coded frame to another, similar to the known bounding of the quantizer parameter 111.

Target Bit-Rate and Buffer Control

Given a candidate value of frame skip $f_s$, a target bit-rate T for a particular object is dependent on this value of $f_s$, and the current buffer level $B_i$. An initial target, $T_1$ is determined according to the number of bits remaining in the video, the number of remaining objects, and the number of bits required to encode the last object, see A. Vetro, H. Sun, and Y. Wang, "MPEG-4 rate control for multiple video objects," *IEEE Trans. Circuits and Syst. Video Technol.*, February 1999. The only difference between this initial estimate and subsequent rates is that the remaining number of objects are divided by the candidates $f_s$. In this way, a proportionately higher number of bits will be assigned to each object when the skip parameter is higher.

After the initial target bit rate has been determined, it is scaled according to, $$T_2 = T_1 \cdot \frac{\tilde{B}_i + 2(B_{\max} - \tilde{B}_i)}{2\tilde{B}_i + (B_{\max} - \tilde{B}_i)}, \quad (14)$$

where a modified buffer fullness $\tilde{B}_i$, accounts for the current value of the skip parameter, and is expressed as, $$\tilde{B}_i = B_i - (f_s - 1) \cdot R_{drain} \quad (15)$$

This modification is made to reflect the lower occupancy level as a result of object skipping. On contrast, prior art methods do not make this adjustment and the scaling operation of equation 14 would force the target bit-rate too low, see ISO/IEC 14496–5:2000 "Information technology—coding of audio/visual objects," Part 5: Reference Software.

If the target bit-rate is too low for lower skip parameter values, the resulting quantizer parameter is unable to differentiate itself from quantizers that were determined at lower skip parameter values. In this case, it is difficult to make the trade-off between coded and temporal distortion in equation 1 to ever favor skipping objects.

Practical Considerations

In practical coding applications, where an encoder would estimate the total distortion, the main problem is to determine the temporal distortion based on past and current data. For instance, equation 9 assumes that the motion between i, the current object, and k, a future object is known. However, this would imply that motion estimation is performed for each candidate object to be coded or not, where these candidate objects have a time index k. This is impractical. Therefore, we assume the motion between objects is linear, and approximate the variance of motion vectors by, $$\sigma^2_{\Delta x_{i,k}} \approx \sigma_{\Delta x_{i-fl,i}} \cdot \left(\frac{k-i}{f_l}\right)^2, \quad (16)$$

where $f_l$ denotes the number of uncoded objects between the last coded object and its reference object.

Similarly, estimates of the distortion for the next candidate object to be coded, i.e., the measurement specified by equation 3, requires knowledge of a and $\sigma_{z_i}^2$, which depends on $f_s$. As mentioned above, motion estimation for every candidate object is not performed, therefore the actual residuals are also unavailable. To overcome this practical difficulty, the residual for future objects can be predicted from the residual of the current object at, i.e., $t=t_i$.

However, as described above, the relationship between the a, $\sigma_{z_i}^2$ and the uncoded objects is not as obvious as the relation between motion and in uncoded objects. Also, we have observed that changes in the variance for different numbers of uncoded objects are very small. Therefore, we use the residual variance of the current object at $t=t_i$ for the candidate objects as well. In this way, changes in $D_c$ are only affected by the "bit budget" for candidate skip factors. One practical problem to consider is how the equations for the distortion of non-coded objects are evaluated based on current and past data. For instance, in its current form, equation 8 assumes that the motion between i, the current time instant, and k, a future time instant is known. However, this would imply that motion estimation is performed for each candidate object, k. Because such computations are not practical, it is reasonable to assume linear motion between objects and approximate the variance of motion vectors by, $$\sigma_{\Delta x_{i,k}}^2 \approx \sigma_{\Delta x_{i-f_i,i}} \cdot \left(\frac{k-i}{f_i}\right)^2. \quad (16)$$

Similarly, estimates of the distortion for the next object to be coded (i.e., calculation of equation 6 requires knowledge of a and $\sigma_{z_i}^2$, which depends on f. As mentioned earlier, motion estimation for every candidate object is not performed, therefore the actual residuals are not available either. To overcome this practical difficulty, the residual for future objects may also be predicted based on the residual of the current object at $t=t_i$. However, as discussed earlier, the relationship between the $\alpha$, $\sigma_{z_t}^2$ and skip is not as obvious as the relation between motion and skip. Also, we have observed that changes in the variance for different skip are very small. Therefore, we use the residual variance of the current object at $t=t_i$ for the candidate objects as well. In this way, changes in $D_c$ are only affected by the bit budget for candidate skip factors.

Frame-Based Results

Figure 4:
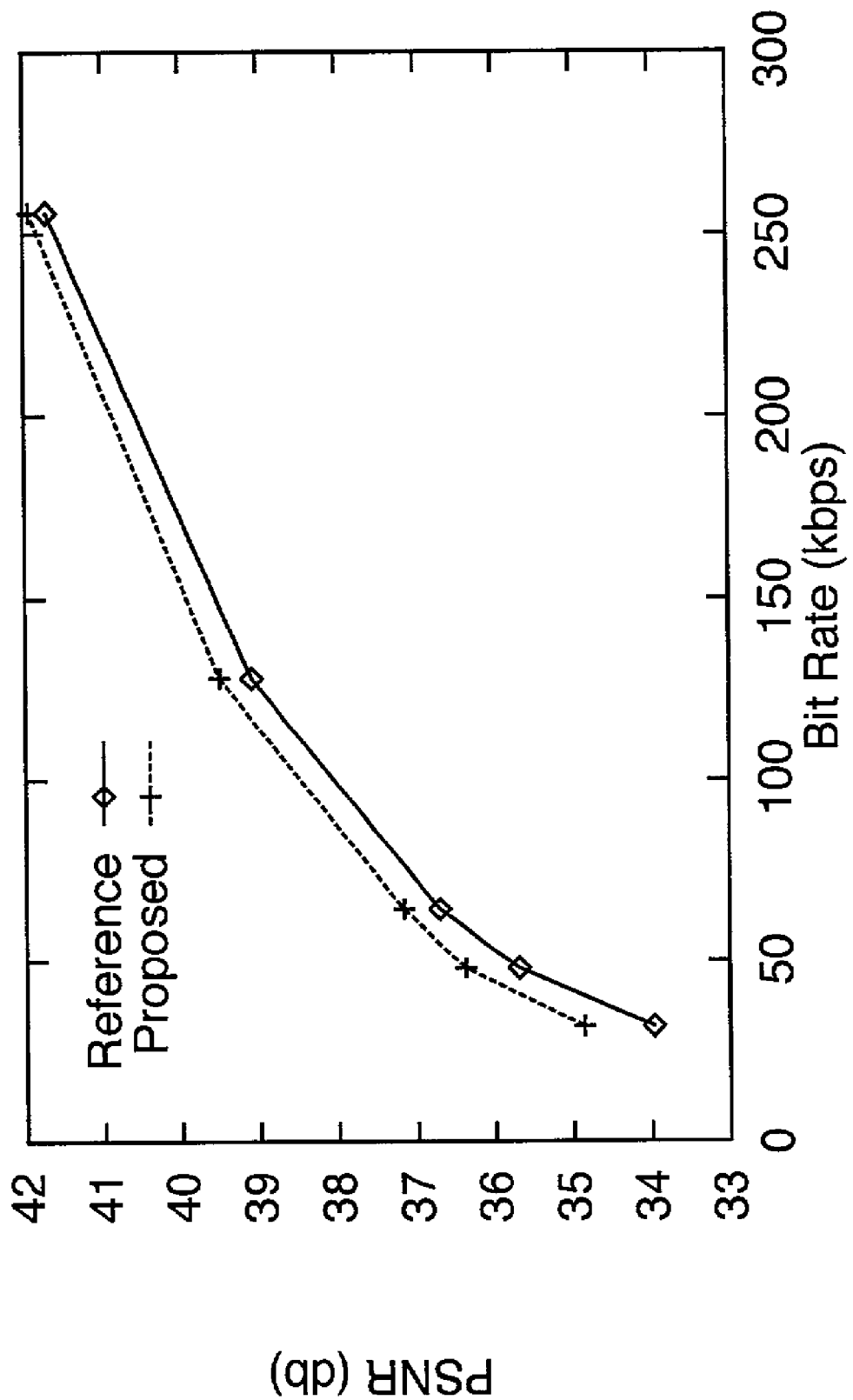
FIG. 4 is a plot comparing the actual and estimated rate-distortion for the uncoded frames of the Akiyo sequence coded at a fixed frame rate of 30 fps.

FIG. 4 shows that our method is accurate for the well known test sequence Akiyo. This sequence is encoded at a number of constant bit-rates using the standard MPEG-4 rate control method that is implemented as part of the reference software, ISO/IEC 14496–5:2000 "Information technology-coding of audio/visual objects," Part 5: Reference Software. The bit-rates that we consider range from 32 Kbps to 256 Kbps, and the sequences are encoded at a full frame-rate of 30 fps.

FIG. 4 shows that the method according to the invention outperforms the reference method. At lowest bit-rates, the difference is almost 1 dB, while at higher bit-rates, an improvement of 0.4 db is observed. In the low bit-rate simulations, the reference method is forced to skip objects due to buffer constraints, whereas the proposed method skips objects based on the minimum distortion criterion and rate constraints as described above.

Object-Based Rate Control

To achieve gains in videos with areas of larger amount of motion, especially a video where the fast motion is localized, e.g., the mouth in the Akiyo sequence, we prefer an object-based framework. In this framework, different objects are coded with different temporal resolutions (video-object-plane or VOP-rates) and different quantization parameters. The frame-rate is a special case of the VOP-rate, that is, the object is an entire frame.

Similar to the problem statement for the frame-based approach, we minimize the average distortion over time, subject to constraints on the bit-rate and buffer size. As defined in equation 13, the minimum distortion is determined by jointly selecting a skip parameter that decides the next frame (object) to be coded, and the quantization parameter that is used to actually code the object.

However, in an object-based framework, we have the freedom to choose different skip parameters and corresponding quantization parameters for each video object. Although such freedom provides the potential for coding gain, it also complicates the problem significantly, because now we must track the individual time instants that each object is coded. This is necessary because we must allocate bits according to a new buffering policy. The new policy may need to account for irregular buffer updates based on arbitrarily shaped objects with different complexity and size. Furthermore, this must be done to avoid any potential composition problems that would be encountered by the decoder. For details on the composition problem and how it can be avoided, see U.S. patent application Ser. No., 09/579,889, "Method for encoding and transcoding multiple video objects with variable temporal resolution", filed by Vetro et al. on May 26, 2000.

In the prior art, see C. W. Hung and D. W. Lin, "Towards jointly optimal rate allocation for multiple videos with possibly different object rates," in Proc. Int'l Sump. on Circuits and Systems, Geneva, Switzerland, May 2000, the problem of rate allocation for multiple video sequences with different object rates was considered. They described the problem only within the context of frame-based video coding, where composition problems were not a concern.

The frame-based problem for multiple video coding was described by L. Wang and A. Vincent, in "Joint rate control for multi-program video coding," IEEE Trans. Consumer Electronics, vol. 42, no. 3, pp. 300–305, August 1996. However, the possibility to have different frame-rates in video sequences was never considered. From this earlier work, however, the concept of a super-frame is still used. A super-frame refers to a set of video objects that are co-located in time.

Figure 5A:
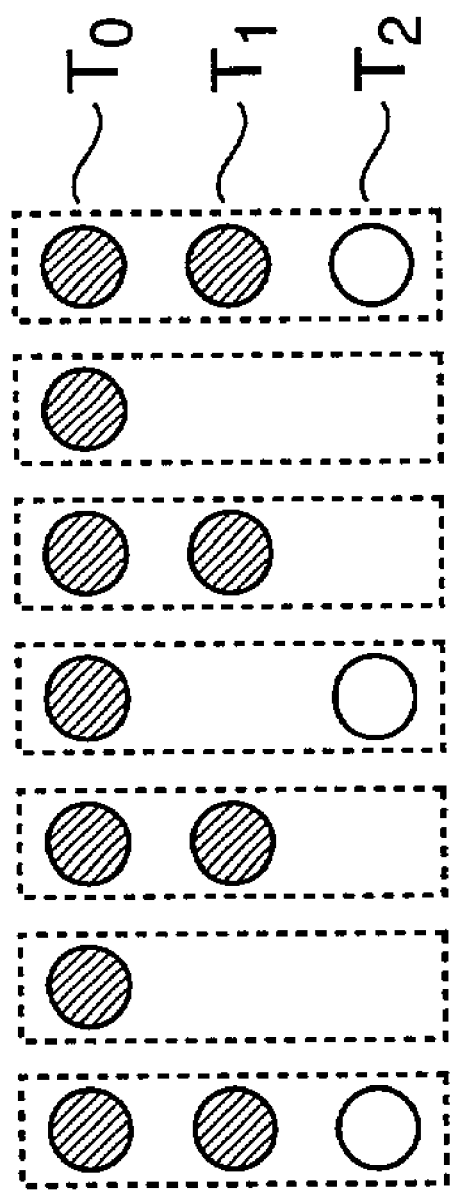
FIG. 5a illustrates a constrained case for object-based coding, which shows variable VOP-rates of each abject with regular or constrained VOP-skip.
Figure 5B:
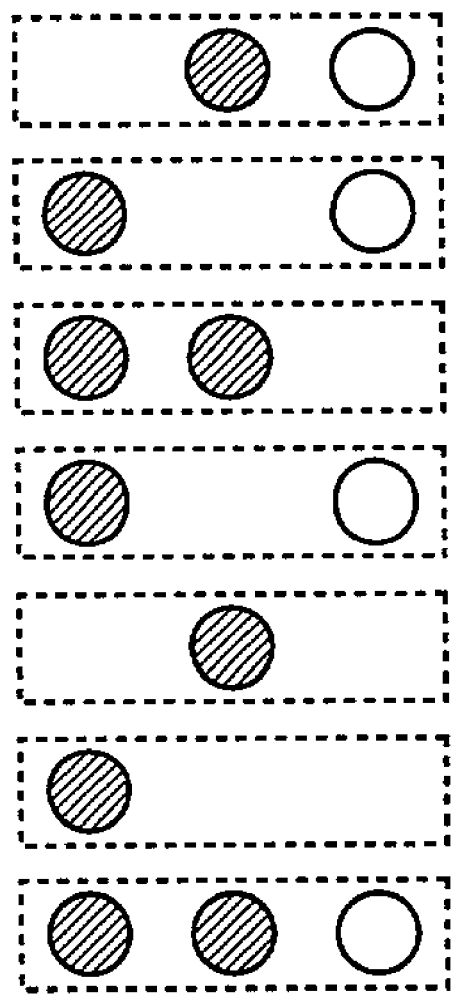
FIG. 5b illustrates an unconstrained case for object-based coding, which shows variable VOP-rates of each object with irregular or unconstrained VOP-skip.

FIG. 5a illustrates this concept for a constrained case, and FIG. 5b for the unconstrained case. In these Figures, a super-frame is represented by the different video sources that are encapsulated in the dotted lines. For objects in the same scene, this term becomes less meaningful because all objects are in one frame. The method described by Hung and Lin considered both the constrained and unconstrained cases to deal with the rate allocation and buffer control problems under varying temporal conditions.

In the constrained case, the delay is dependent on the super-frame period, which is equal to the time between cycles and can be calculated from the fixed VOP-rates of each sequence. For example, in FIG. 5a, the cycle is equal to 6. Within this cycle, the R-D characteristics of each object is accumulated and bit allocation is then performed. Overall, this techniques suffers from three main problems: (1) delay is introduced to collect the R-D values, (2) the actual R-D values are obtained through a simulated coder, and (3) the VOP-rates for each sequence are chosen by some other method.

With respect to the first problem, restricting the range of observation time can reduce delay. This is actually what is done for multiple video sequences with no periodic structure, i.e., when the super-frame period is infinite or the VOP-rates are unconstrained. However, this limitation in observation time requires the ability to predict the R-D characteristics for future objects having different complexity and size. Given that this can be done, the need to collect the actual R-D values is no longer required. Finally, if these R-D values contain information about the distortion for non-coded objects, then there is no need to choose the fixed VOP-rates for each sequence beforehand. This assumes some a priori knowledge about objects in video sequences.

Our method solves all of the above problems. Similar to Equation 13 without the restrictions on the bit-rate and buffer size, the problem for the constrained case as shown in FIG. 5a can formally be stated as, $$arg\ min_{[Q,f_s,\underline{\theta}]} \overline{D}_{[t_i,t_{i+f_s}]}(Q,f_s,\underline{\theta}), \quad (17)$$

where Q is a matrix of quantization parameters for each video object plane (object) coded at various time instants within the time interval $(t_i, t_{i+f_s}]$, and $f_s$ denotes the time duration of a periodic cycle. The length of this cycle is a parameter itself and is dependent on the individual skip parameter for each object, specified by $\underline{\theta}$.

With variable VOP-rates for each object, we do not assume that each object will be coded at every time instant within the specified interval. Therefore, zero values are placed in Q to denote time instants that a particular object remains uncoded. In the example shown in FIG. 5a, $\underline{\theta}^T=[1,2,3]^T$, $f_s=6$, and Q would be a 3×6 matrix with 7 out of the 18 being zero elements.

In order to satisfy the VOP-rate requirements for the constrained case, in general, i.e., the VOP-rates of all of the objects must lead to a periodic structure, we require that $$f_s = LCF(\underline{\theta}) \leq f_{max}, \quad (18)$$

where $LCF(\underline{\theta})$ denotes the least common factor among the VOP-rates $\underline{\theta}$.

To further define the constraints on the bit-rate and buffer size, we let M denote the set of all objects and $T_j$ denote the set of time indices for which an object j is coded. For example, in FIGS. 5a, $T_0=\{1,2,3,4,5,6\}$, $T_1=\{2,4,6\}$, and $T_2=\{3,6\}$. Then, the constraint on the rate is expressed as, $$\sum_{j \in M} \sum_{n \in T_j} R_j(t_{i+n}) \leq R_{budget} \quad (19)$$

which essentially says that the sum of the bit-rates for all objects, at all time instants within the specified time interval, must be less that the calculated bit-rate budget over that time interval.

To define the constraints on the buffer size, we let $$L = \bigcup_{j \in M} \{T_j\}$$

denote the complete set of coded indices. Also, given l∈L, we let $l_0$ equal the previous value of l except when l is the first element in L; in that case, $l_0=0$. Then, we defined the set of buffer constraints as, $$B_{i+l_0} + \sum_{j \in M_l} R_j(t_{i+l}) < B_{max};\ \forall\ l \in L \quad (20)$$

-continued $$B_{i+l_0} + \sum_{j \in M_l} R_j(t_{i+l}) - (l - l_0) \cdot R_{drain} > 0;\ \forall\ l \in L$$

where $M_l$ denotes the set of objects that are coded at index l. The above conditions ensure that buffer overflow and underflow are avoided at every coded time instant.

In one embodiment, we solve the minimization given in equation 17 that is subject to constraints given by equations 18–20 by first breaking the main problem into smaller sub-problems. In this way, each object has its own sub-problem and can be solved using the frame-based optimization discussed above. Using the solutions to each sub-problem as input, we then consider the global solution. Of course, this can be accomplished through several iterations.

In an alternative embodiment, we first allocate a target number of bits to each object, and then determine the skip ($f_s$) and quantizer (Q) parameter for each object separately. The initial rate allocation can be based on the previous rate-distortion characteristics of each object. As with the above approach, individual solutions for each object need to be re-considered in light of the constraints on individual skip factors, and overall bit-rate and buffer size constraints.

In yet another alternative embodiment, the problem is directly solved globally by searching over all valid combinations of skip and quantization parameters. This may be done in an iterative manner as above, where several choices for $f_s$ are considered. The main difference is that the vector $\underline{\theta}$ can have numerous possibilities for each VOP-skip parameter $f_s$. Therefore, all valid possibilities for $\underline{\theta}$ need to be evaluated in each case.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for encoding a video including a plurality of objects, comprising:

determining, for each candidate object, a quantizer parameter and a skip parameter that jointly minimizes an average total distortion in the video while satisfying predetermined constraints, the average total distortion including spatial distortion of coded objects based on the quantizer parameter, spatial and temporal distortion of uncoded objects based on the quantizer parameter and the skip parameter, wherein an average skip parameter is $$\overline{f}_s = \frac{F_{src}}{\overline{F}},$$

$F_{src}$ is a source frame-rate, and $\overline{F}$ is an average coded frame rate; and encoding the candidate objects as the coded objects with the quantizer parameter and the skip parameter, and skipping the candidate objects as the uncoded objects with the the skip parameter, to optimally minimize the average total distortion in the video.

2. The method of claim 1 wherein the object is a video object plane having an arbitrary shape and size.

3. The method of claim 1 wherein the object is a video frame having a rectangular shape and fixed size.

4. The method of claim 1 wherein the skip parameter is $f_s$, and further comprising:

skipping ($f_s-1$) uncoded objects.

5. The method of claim 1 further comprising:

encoding multiple candidate objects concurrently.

6. The method of claim 1 wherein the average total distortion is $$\arg\min_{[Q_{i+f_s}, f_s]} \overline{D}_{[t_i, t_{i+f_s}]}(Q_{i+f_s}, f_s)$$

wherein Q is the quantizer parameter, $f_s$ is the frameskip parameter, and the predetermined constraints are $$s.t. \begin{cases} \overline{R} \leq R \\ B_i + R(t_{i+f_s}) < B_{\max} \\ B_i + R(t_{i+f_s}) - f_s \cdot R_{drain} > 0 \end{cases}$$

R is a target bit-rate, $B_{max}$ is a maximum buffer size in bits, $B_i$ is a current buffer level, and $R_{drain}$ is a buffer drain rate.

7. The method of claim 1 further comprising:

initializing $f_l$ to 1;

a) setting a maximum skip parameter to $f_s = \max\{1, f_l - \delta\}$, $D_{min} = \infty$ for a minimum distortion $D_{min}$;

b) determining a target number of bits for the candidate object;

c) determining a value of the quantizer parameter;

d) determining if the quantizer parameter and the skip parameter still satisfies the bit-rate and the buffer constraints;

e) determining a distortion;

incrementing the skip parameter as a new $f_s \leq \min\{f_l + \delta, f_{max}\}$ if false and repeating steps b–e until true;

determining if the average total distortion is minimized; and repeating the steps beginning at step a) otherwise.

8. The method of claim 7 wherein the target bit rate is scaled to account for a current value of the skip parameter.

* * * * *